United States Patent
Lin et al.

(10) Patent No.: US 11,535,244 B2
(45) Date of Patent: Dec. 27, 2022

(54) PARKING ASSISTANCE METHOD, VEHICLE-MOUNTED DEVICE AND READABLE STORAGE MEDIUM

(71) Applicant: Chiun Mai Communication Systems, Inc., New Taipei (TW)

(72) Inventors: Jian-Cheng Lin, New Taipei (TW); Hsiu-Hua Yen, New Taipei (TW); Chih-Pu Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 17/228,949

(22) Filed: Apr. 13, 2021

(65) Prior Publication Data

US 2021/0316719 A1 Oct. 14, 2021

(30) Foreign Application Priority Data

Apr. 14, 2020 (CN) .......................... 202010290621.3

(51) Int. Cl.
| | |
|---|---|
| H04N 5/44 | (2011.01) |
| B60W 30/06 | (2006.01) |
| B60W 50/14 | (2020.01) |
| G08G 1/017 | (2006.01) |
| G06V 10/56 | (2022.01) |
| G06V 20/58 | (2022.01) |
| G06V 20/56 | (2022.01) |

(52) U.S. Cl.
CPC ............ *B60W 30/06* (2013.01); *B60W 50/14* (2013.01); *G06V 10/56* (2022.01); *G06V 20/586* (2022.01); *G06V 20/588* (2022.01); *G08G 1/0175* (2013.01); *B60W 2050/146* (2013.01); *B60W 2555/60* (2020.02); *B60W 2556/60* (2020.02)

(58) Field of Classification Search
CPC ..... B60W 30/06; G06V 20/58; G06V 20/586; G08G 1/168; B62D 15/0285
See application file for complete search history.

(56) References Cited

U.S. PATENT DOCUMENTS

| 6,133,855 | A | * | 10/2000 | Kim | B60Q 9/002 |
|---|---|---|---|---|---|
| | | | | | 340/988 |
| 2017/0355307 | A1 | * | 12/2017 | Ha | G08G 1/143 |
| 2018/0093664 | A1 | * | 4/2018 | Kim | B60W 10/18 |
| 2019/0066517 | A1 | * | 2/2019 | Neser | G07B 15/02 |
| 2019/0096254 | A1 | * | 3/2019 | Havercamp | G06V 30/1473 |
| 2020/0143682 | A1 | * | 5/2020 | Chow | G08G 1/0112 |
| 2020/0265713 | A1 | * | 8/2020 | Abeling | G08G 1/04 |
| 2020/0356793 | A1 | * | 11/2020 | Chung | G06V 20/588 |
| 2020/0364467 | A1 | * | 11/2020 | Wang | G06V 10/255 |
| 2021/0216797 | A1 | * | 7/2021 | Joos | G06V 10/82 |
| 2021/0375135 | A1 | * | 12/2021 | Yang | H04W 4/029 |

FOREIGN PATENT DOCUMENTS

| CN | 108932851 A | 12/2018 |
|---|---|---|
| CN | 110807565 A | 2/2020 |
| TW | 200951893 A | 12/2009 |

* cited by examiner

*Primary Examiner* — Munear T Akki
(74) *Attorney, Agent, or Firm* — ScienBiziP, P.C.

(57) ABSTRACT

A parking assistance method is provided. The method includes recognizing image features of a traffic line corresponding to a parking position of a vehicle. A category of the parking position of the vehicle is determined based on the image features of the traffic line. Once the vehicle is determined to be parking illegally based on the category of the parking position of the vehicle; a warning is issued.

18 Claims, 4 Drawing Sheets

PARKING ASSISTANCE METHOD, VEHICLE-MOUNTED DEVICE AND READABLE STORAGE MEDIUM

FIELD

The present disclosure relates to parking control technology, in particular to a parking assistance method, a vehicle-mounted device, and a readable storage medium.

BACKGROUND

A driver may park a vehicle on a road. However, parking in an area where parking is not allowed may cause the vehicle to be towed and the driver fined.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
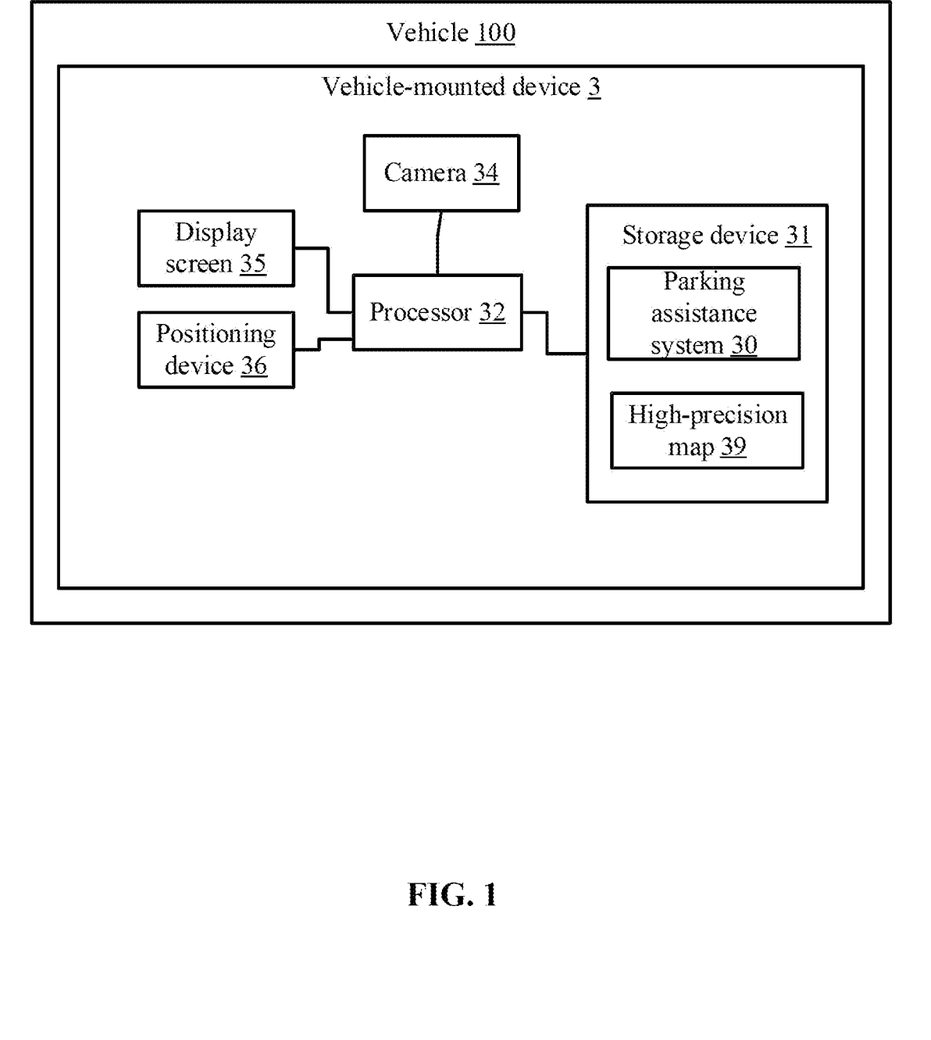
FIG. 1 illustrates a schematic diagram of a vehicle-mounted device of the present disclosure.

FIG. 1 illustrates a schematic diagram of a vehicle-mounted device 3 of the present disclosure.

In at least one embodiment, the vehicle-mounted device 3 is installed on a vehicle 100. The vehicle-mounted device 3 is essentially a vehicle-mounted computer. The vehicle-mounted device 3 includes a storage device 31, at least one processor 32, at least one camera 34, a display screen 35, a positioning device 36. The above listed components are electrically connected to each other.

Those skilled in the art should understand that the structure of the vehicle-mounted device 3 shown in FIG. 1 does not constitute a limitation of the embodiment of the present disclosure. The vehicle-mounted device 3 may further include more or less other hardware or software than that shown in FIG. 1, or the vehicle-mounted device 3 may have different component arrangements.

It should be noted that the vehicle-mounted device 3 is merely an example. If other kind of vehicle-mounted devices can be adapted to the present disclosure, it should also be included in the protection scope of the present disclosure, and incorporated herein by reference.

In some embodiments, the storage device 31 may be used to store program codes and various data of computer programs. For example, the storage device 31 may be used to store a parking assistance system 30 and a high-precision map 39 installed in the vehicle-mounted device 3, and implement high-speed and automatic completion of storing programs or data during operation of the vehicle-mounted device 3. The storage device 31 may include Read-Only Memory (ROM), Programmable Read-Only Memory (PROM), and Erasable Programmable Read-Only Memory (EPROM), One-time Programmable Read-Only Memory (OTPROM), Electronically-Erasable Programmable Read-Only Memory (EEPROM), Compact Disc Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit, or multiple packaged integrated circuits with same function or different function. The at least one processor 32 includes one or more central processing units (CPUs), one or more microprocessors, one or more digital processing chips, one or more graphics processors, and various control chips. The at least one processor 32 is a control unit of the vehicle-mounted device 3. The at least one processor 32 uses various interfaces and lines to connect various components of the vehicle-mounted device 3, executes programs or modules or instructions stored in the storage device 31, and invokes data stored in the storage device 31 to perform various functions of the vehicle-mounted device 3 and process data, for example, perform a function of assisting parking for the vehicle 100 (for details, see the description of FIG. 3).

In this embodiment, the at least one camera 34 can be installed at any position on the vehicle 100 where there the at least one camera 34 can capture images of a traffic line corresponding to a parking position of the vehicle 100. For example, the at least one camera 34 can be installed on a chassis of the vehicle 100 or the at least one camera 34 can be installed around the vehicle 100.

In this embodiment, the traffic line refers to a line at an edge of a lane that indicates traffic information such as guidance, restrictions, warnings, etc. to drivers.

The display screen 35 may be a touch display screen for displaying various data of the vehicle-mounted device 3, such as a user interface of the high-precision map 39. In this embodiment, the high-precision map 39 may be a map such as a BAIDU high-precision map or other maps such as a GOOGLE high-precision map.

In this embodiment, the high-precision map 39 indicates all roads, the traffic line corresponding to each road, a color of each traffic line, and other characteristics. It should be noted that the high-precision map 39 can also indicate lanes included in each road, intersections included in each road, a traffic rule of each intersection, and whether an intersection is accident-prone, and so on.

In one embodiment, the traffic rule of each intersection includes restrictions on the turning of vehicles at the each intersection. In other embodiments, the traffic rule of each intersection further includes restrictions on vehicle models (such as large vehicles, small vehicles), weight, height, and length of vehicles allowed on each road at the each intersection.

In an embodiment, the high-precision map 39 records a number of traffic accidents that have occurred at each intersection, and defines whether each intersection is accident-prone according to the number of traffic accidents that have occurred.

In this embodiment, the positioning device 36 can be used to locate a current position (such as longitude and latitude information) of the vehicle 100. In one embodiment, the positioning device 36 may be a combination of GPS (Global Positioning System) device and a gyroscope. In other embodiments, the positioning device 36 can be a Global Positioning System (GPS), an Assisted Global Positioning System (AGPS), a BeiDou Navigation Satellite System (BDS), a global navigation satellite system (GLONASS), or a combination thereof.

In this embodiment, the parking assistance system 30 may include one or more modules. The one or more modules are stored in the storage device 31, and executed by at least one processor (e.g. the at least one processor 32 in this embodiment), such that a function of assisting parking for the vehicle 100 (for details, see the introduction to FIG. 3 below) is achieved.

Figure 2:
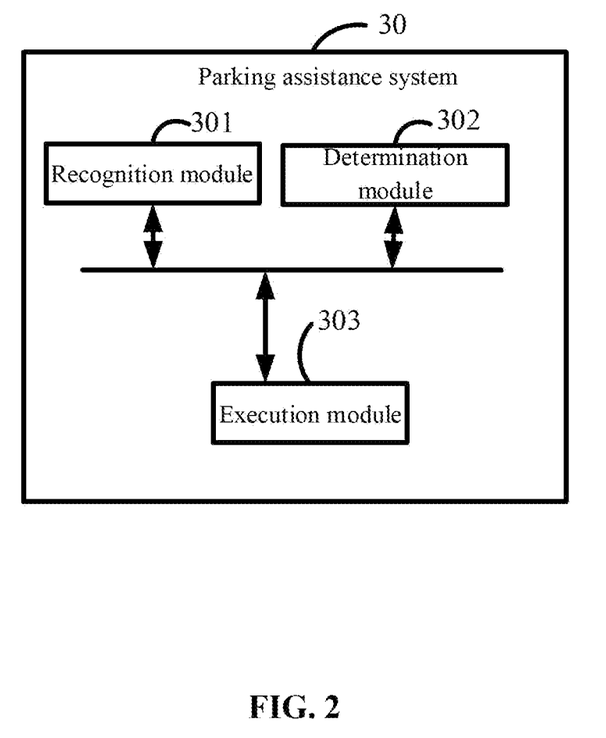
FIG. 2 shows one embodiment of modules of a parking assistance system of the present disclosure.

In this embodiment, the parking assistance system 30 may include a plurality of modules. Referring to FIG. 2, the plurality of modules includes a recognition module 301, a determination module 302, and an execution module 303. The modules referred to in the present disclosure refer to a series of computer-readable instructions that can be executed by at least one processor (for example, the at least one processor 32), can complete fixed functions, and can be stored in a storage device (for example, the storage device 31 of the vehicle-mounted device 3). In this embodiment, the functions of each of the modules will be described in detail with reference to FIG. 3.

In this embodiment, the recognition module 301 can recognize image features of the traffic line corresponding to the parking position of the vehicle 100. The determination module 302 can determine a category of the parking position of the vehicle 100 based on the image features of the traffic line; and can determine whether the vehicle 100 parks illegally based on the category of the parking position of the vehicle 100. When it is determined that the vehicle 100 parks illegally based on the category of the parking position of the vehicle 100, the execution module 303 issues a warning to prompt the driver of the vehicle 100 that the vehicle 100 parks illegally, such that the driver of the vehicle 100 can drive the vehicle 100 away from the parking position and can be prevented from being fined and even towed when the vehicle 100 is parked in an area that is not allowed to park.

It should be noted that in this embodiment, the functions of the recognition module 301, the determination module 302, and the execution module 303 will be described in detail later in conjunction with FIG. 3.

In this embodiment, an integrated unit implemented in a form of a software functional module can be stored in a non-transitory readable storage medium. The above listed modules include one or more computer-readable instructions. The vehicle-mounted device 3 or a processor implements the one or more computer-readable instructions, such that the method for assisting parking for the vehicle 100 shown in FIG. 3 is achieved.

In a further embodiment, referring to FIG. 2, the at least one processor 32 can execute an operating system of the vehicle-mounted device 3, various types of applications (such as the parking assistance system 30 described above), program codes, and the like.

In a further embodiment, the storage device 31 stores program codes of a computer program, and the at least one processor 32 can invoke the program codes stored in the storage device 31 to achieve related functions. For example, each of the modules of the parking assistance system 30 shown in FIG. 2 is a program code stored in the storage device 31. Each of the modules of the parking assistance system 30 shown in FIG. 2 is executed by the at least one processor 32, such that the functions of the modules are achieved, and a purpose of assisting parking for the vehicle 100 (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of assisting parking for the vehicle 100. Specifically, the computer-readable instructions executed by the at least one processor 32 to achieve the purpose of assisting parking for the vehicle 100 is described in detail in FIG. 3 below.

Figure 3:
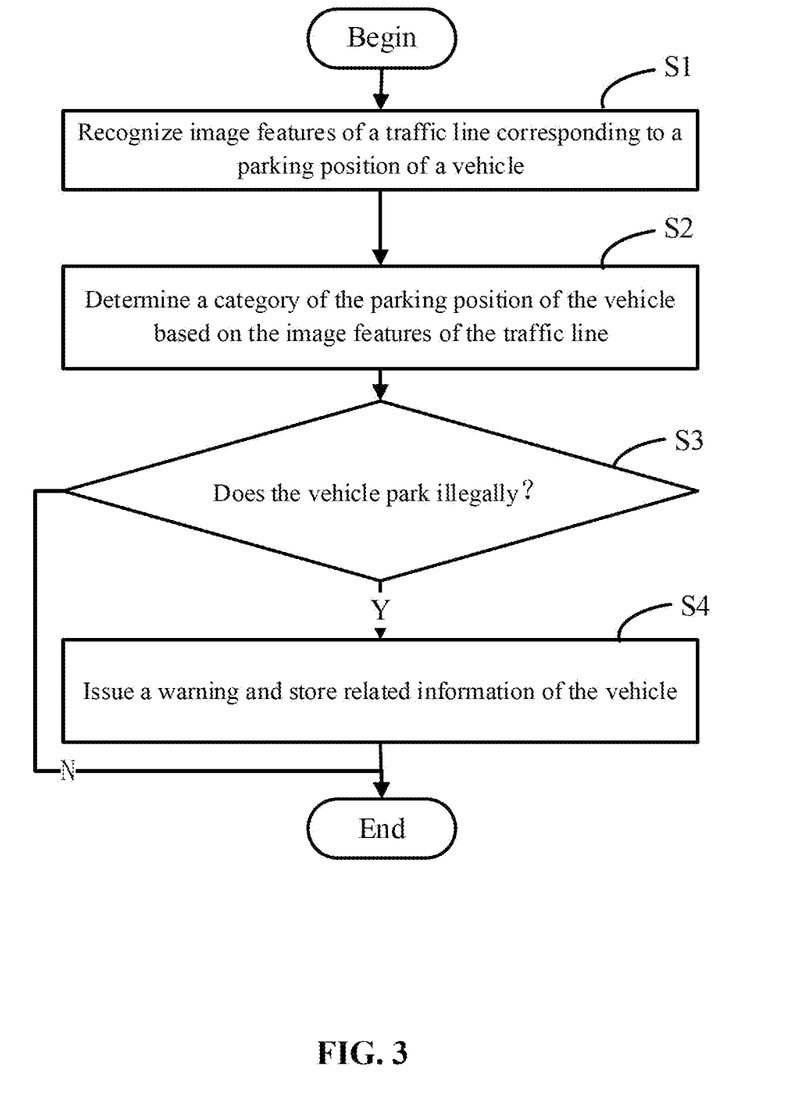
FIG. 3 shows a flow chart of one embodiment of a parking assistance method of the present disclosure.

FIG. 3 is a flowchart of a parking assistance method according to a preferred embodiment of the present disclosure.

In this embodiment, the parking assistance method can be applied to the vehicle-mounted device 3. For the vehicle-mounted device 3 that requires to assist overtaking for a vehicle, the vehicle-mounted device 3 can be directly integrated with the function of assisting parking. The vehicle-mounted device 3 can also achieve the function of assisting parking by running a Software Development Kit (SDK).

Referring to FIG. 3, the method is provided by way of example, as there are a variety of ways to carry out the method. The method described below can be carried out using the configurations illustrated in FIG. 1, for example, and various elements of these figures are referenced in the explanation of the method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The method can begin at block S1.

At block S1, the recognition module 301 can recognize image features of the traffic line corresponding to the parking position of the vehicle 100.

In a first embodiment, the recognizing the image features of the traffic line corresponding to the parking position of the vehicle 100 includes: locating the parking position of the vehicle 100 on the preset high-precision map 39 using the positioning device 36; and obtaining the image features of the traffic line corresponding to the parking position of the vehicle 100 from the high-precision map 39, wherein the image features include, but are not limited to, color features and/or shape features.

In a second embodiment, the recognizing the image features of the traffic line corresponding to the parking position of the vehicle 100 includes: capturing an image of the traffic line corresponding to the parking position of the vehicle 100 using the at least one camera 34; and recognizing the image features of the traffic line from the image using an image recognition algorithm, wherein the image features includes, but is not limited to, color feature and/or shape feature.

In this embodiment, the recognizing the image features of the traffic line from the image includes: recognizing the traffic line from the image using a template matching method; cropping an area of the traffic line from the image and obtaining the area of the traffic line; calculating RGB value of each pixel of the area of the traffic line; determining a color of the traffic line according to the RGB values of all pixels of the area of the traffic line. For example, the recognition module 301 can pre-define a range of the RGB value corresponding to each kind of color; determine the color of each pixel according to the RGB value of each pixel; and set the color corresponding to the most pixels as the color of the traffic line.

In this embodiment, various types of traffic lines (for example, white lines, red lines, yellow lines, etc.) can be used as templates respectively.

It should be noted that in other embodiments, the recognition module 301 can first recognize the image features of the traffic line corresponding to the parking position of the vehicle 100 according to the first embodiment; if the image features of the traffic lines corresponding to the parking position of the vehicle 100 cannot be recognized using the first embodiment, the recognition module 301 can then recognize the image features of the traffic line corresponding to the parking position of the vehicle 100 according to the second embodiment.

It should be also noted that in other embodiments, the recognition module 301 can first recognize the image features of the traffic line corresponding to the parking position of the vehicle 100 according to the second embodiment; if the image features of the traffic lines corresponding to the parking position of the vehicle 100 cannot be recognized using the second embodiment, the recognition module 301 can then recognize the image features of the traffic line corresponding to the parking position of the vehicle 100 according to the first embodiment.

In addition, different countries prescribe different driving directions, i.e., some countries prescribe the driving direction is to drive on the right and others countries prescribes the driving direction is to drive on the left. Here, if the traffic rule of a country prescribes the driving direction is to drive on the right, then the traffic line corresponding to the parking position of the vehicle 100 refers to the traffic line on a right side of a lane where the vehicle 100 is located. On the contrary, if the prescribed driving direction is to drive on the left, then the traffic line corresponding to the parking position of the vehicle 100 refers to the traffic line on the left side of the lane where the vehicle 100 is located. That is, the traffic line corresponding to the parking position of the vehicle 100 is related to the driving direction prescribed by the traffic rule.

Figure 4:
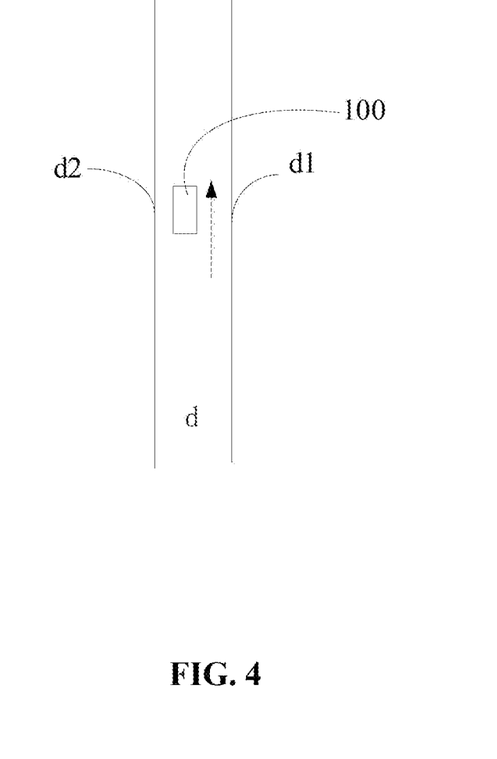
FIG. 4 illustrates traffic lines of a lane.

For example, referring to FIG. 4, the vehicle 100 is currently parked in the lane d. If the driving direction prescribed by the traffic rule is to drive on the right, then the traffic line corresponding to the parking position of the vehicle 100 is d1. Conversely, if the driving direction prescribed by the traffic rules is to drive on the left, then the traffic line corresponding to the parking position of the vehicle 100 refers to d2.

In one embodiment, the recognizing the image features of the traffic line from the image includes: determine a country in which the vehicle 100 is currently located using the positioning device 36; determine the driving direction prescribed by the traffic rule of the determined country; and obtain the image of the traffic line corresponding to the parking position of the vehicle 100 under a condition that the prescribed driving direction is determined; and recognize the image features of the traffic line corresponding to the parking position of the vehicle 100. In one embodiment, if the traffic rule prescribes the driving direction is to drive on the right, then the image of the traffic line corresponding to the parking position of the vehicle 100 refers to the image of the traffic line on the right side of the lane where the vehicle 100 is located. On the contrary, if the prescribed driving direction is to drive on the left, then the image of the traffic line corresponding to the parking position of the vehicle 100 refers to the image of the traffic line on the left side of the lane where the vehicle 100 is located.

In one embodiment, the recognition module 301 recognizes the image features of the traffic line corresponding to the parking position of the vehicle 100 when the vehicle 100 is parked. In other words, the parking position may be defined as a current position of the vehicle 100 on the premise that the vehicle 100 is parked.

Specifically, when a driving speed of the vehicle 100 is 0, the recognition module 301 determines that the vehicle 100 is parked. In this embodiment, the recognition module 301 may use a speed sensor (not shown in the figure) to obtain the driving speed of the vehicle 100.

At block S2, the determination module 302 can determine a category of the parking position of the vehicle 100 based on the image features of the traffic line.

In an embodiment, the determining the category of the parking position of the vehicle 100 based on the image features of the traffic line includes:

determining that the parking position of the vehicle 100 is a no-parking position when the color feature of the traffic line is red;

determining that the parking position of the vehicle 100 is a legal parking position when the color feature of the traffic line is white; and determining that the parking position of the vehicle 100 is a temporary parking position when the color feature of the traffic line is yellow.

In one embodiment, when the traffic line corresponding to the parking position of the vehicle 100 is not recognized in block S1 (e.g., the traffic line corresponding to the parking position of the vehicle 100 is not recognized from the high-precision map 39, or the area of the traffic line is not obtained from the image captured by the camera 34), the determination module 302 determines that the parking position of the vehicle 100 is the legal parking position.

At block S3, the determination module 302 can determine whether the vehicle 100 parks illegally based on the category of the parking position of the vehicle 100. When the determination module 302 determines that the vehicle 100 parks illegally, block S4 is executed. When the determination module 302 determines that the vehicle 100 parks legally, the process ends.

In this embodiment, the determining whether the vehicle 100 parks illegally based on the category of the parking position of the vehicle 100 includes:

determining that the vehicle 100 parks illegally when the parking position of the vehicle 100 is the no-parking position;

determining that the vehicle 100 parks legally when the parking position of the vehicle 100 is the legal parking position; and detecting the parking parameters of the vehicle 100 when the parking position of the vehicle 100 is the temporary parking position, and determining whether the vehicle 100 parks illegally based on the parking parameters of the vehicle 100 and a parking rule corresponding to the temporary parking position.

In one embodiment, the parking parameters of the vehicle 100 include, but are not limited to, a parking time period when the vehicle 100 parks at the parking position, a parking time length when the vehicle 100 parks at the parking position, and whether an engine of the vehicle is turned off when the vehicle 100 parks at the parking position.

Specifically, the parking rule corresponding to the temporary parking position includes restrictions on the parking time period and the parking time length, and the engine of the vehicle should not be turned off when the vehicle parks at the temporary parking position. Therefore, when the vehicle 100 is in the temporary parking position, the determination module 302 can determine whether the vehicle 100 parks illegally according to the parking parameters of the vehicle 100 and the parking rule corresponding to the temporary parking position.

For example, if the parking rule indicates that vehicles cannot park at a temporary parking position "A" between 9:00 am-12:00 am, and vehicles can park at the temporary parking position "A" for a limit of 10 minutes in other time periods; then when a current time belongs to a restricted time period (i.e., 9:00 am-12:00 am) of the temporary parking position "A", the determination module 302 can determine that the vehicle 100 parks illegally. For another example, if the vehicle 100 parks the temporary parking position "A" in the other time periods, but the time length of parking of the vehicle 100 is greater than 10 minutes, the determination module 302 can determine that the vehicle 100 parks illegally.

At block S4, the execution module 303 can issue a warning when the vehicle 100 parks illegally to inform the driver of the vehicle 100 that the vehicle 100 parks illegally, such that the driver of the vehicle 100 can drive the vehicle 100 away from the current position and can be prevented from being fined and even towed.

In one embodiment, the execution module 303 can issue the warning by displaying text information on the display screen 35, and prompt the driver of the vehicle 100 that the vehicle 100 parks illegally using the text information.

In other embodiments, the execution module 303 can issue the warning by prompting the driver of the vehicle 100 that the vehicle 100 parks illegally in a manner of voice broadcast.

In one embodiment, when the vehicle 100 parks illegally, the execution module 303 stores related information of the vehicle 100. For example, the related information of the vehicle 100 may be stored in a server that is in communication with the vehicle-mounted device 3, and the server may be a server of a vehicle management company such as a taxi company or a logistics company. This facilitates the management of each vehicle by the vehicle management company. Of course, the execution module 303 may also store related information of the vehicle 100 in the storage device 31 of the vehicle-mounted device 3.

In one embodiment, the related information of the vehicle 100 may include, but is not limited to, driver information of the vehicle 100 (for example, the driver's name, driver's license number, etc.), a license plate number of the vehicle 100, the parking position of the vehicle 100, and the time when the vehicle 100 parks illegally.

In one embodiment, the execution module 303 or the server may also analyze parking violations of all vehicles based on the stored related information of all vehicles. The analyzing of the parking violations of all vehicles include, but not limited to: determining the parking positions which are illegally parked for a greatest number of times; and determining the drivers who parked illegally for a greatest/least number of times.

The execution module 303 or the server may also implement rewards and punishments to the drivers based on the analyzing of the parking violations. For example, the execution module 303 or the server may deduct the bonuses of a driver who parked illegally for the greatest number of times.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A parking assistance method applied to a vehicle-mounted device, the method comprising:
   recognizing image features of a traffic line corresponding to a parking position of a vehicle; the image features comprise color features;
   determining a category of the parking position of the vehicle based on the image features of the traffic line;
   determining whether the vehicle parks illegally based on the category of the parking position of the vehicle;
   issuing a warning when the vehicle parks illegally;
   determining that the parking position of the vehicle is a legal parking position when the traffic line corresponding to the parking position of the vehicle is not recognized;
   the determining the category of the parking position of the vehicle based on the image features of the traffic line comprises:
      determining that the parking position of the vehicle is a temporary parking position when the color feature of the traffic line is yellow;
   detecting parking parameters of the vehicle when the parking position of the vehicle is the temporary parking position, and
   determining whether the vehicle parks illegally based on the parking parameters of the vehicle and a parking rule corresponding to the temporary parking position;
   wherein the parking parameters of the vehicle comprise a parking time period, a parking time length, and whether an engine of the vehicle is turned off when the vehicle parks at the parking position.

2. The parking assistance method according to claim 1, wherein the recognizing the image features of the traffic line corresponding to the parking position of the vehicle comprises:
   locating the parking position of the vehicle on a high-precision map using a positioning device; and
   obtaining the image features of the traffic line corresponding to the parking position of the vehicle from the high-precision map.

3. The parking assistance method according to claim 2, wherein the positioning device is a combination of a GPS device and a gyroscope.

4. The parking assistance method according to claim 1, wherein the recognizing the image features of the traffic line corresponding to the parking position of the vehicle comprises:
   capturing an image of the traffic line corresponding to the parking position of the vehicle using a camera; and
   recognizing the image features of the traffic line from the image using an image recognition algorithm.

5. The parking assistance method according to claim 1, further comprising:
   wherein the determining the category of the parking position of the vehicle based on the image features of the traffic line further comprises:

determining that the parking position of the vehicle is a no-parking position when the color feature of the traffic line is red; and determining that the parking position of the vehicle is the legal parking position when the color feature of the traffic line is white.

6. The parking assistance method according to claim 1, further comprising:

storing related information of the vehicle when the vehicle parks illegally;

wherein the related information of the vehicle comprises driver information of the vehicle, a license plate number of the vehicle, the parking position of the vehicle, and the time when the vehicle parks illegally.

7. The parking assistance method according to claim 6, further comprising:

analyzing parking violations of all vehicles based on the related information of all vehicles, comprising:

determining the parking positions which are illegally parked for a greatest number of times; and determining the drivers who parked illegally for a greatest/least number of times.

8. A vehicle-mounted device comprising:

a storage device; and at least one processor;

wherein the storage device stores one or more programs, which when executed by the at least one processor, cause the at least one processor to:

recognize image features of a traffic line corresponding to a parking position of a vehicle; the image features comprise color features;

determine a category of the parking position of the vehicle based on the image features of the traffic line;

determine whether the vehicle parks illegally based on the category of the parking position of the vehicle;

issue a warning when the vehicle parks illegally;

determining that the parking position of the vehicle is a legal parking position when the traffic line corresponding to the parking position of the vehicle is not recognized;

the determining the category of the parking position of the vehicle based on the image features of the traffic line comprises:

determining that the parking position of the vehicle is a temporary parking position when the color feature of the traffic line is yellow;

detecting parking parameters of the vehicle when the parking position of the vehicle is the temporary parking position, and determining whether the vehicle parks illegally based on the parking parameters of the vehicle and a parking rule corresponding to the temporary parking position;

wherein the parking parameters of the vehicle comprise a parking time period, a parking time length, and whether an engine of the vehicle is turned off when the vehicle parks at the parking position.

9. The vehicle-mounted device according to claim 8, wherein the recognizing the image features of the traffic line corresponding to the parking position of the vehicle comprises:

locating the parking position of the vehicle on a high-precision map using a positioning device; and obtaining the image features of the traffic line corresponding to the parking position of the vehicle from the high-precision map.

10. The vehicle-mounted device according to claim 9, wherein the positioning device is a combination of a GPS device and a gyroscope.

11. The vehicle-mounted device according to claim 8, wherein the recognizing the image features of the traffic line corresponding to the parking position of the vehicle comprises:

capturing an image of the traffic line corresponding to the parking position of the vehicle using a camera; and recognizing the image features of the traffic line from the image using an image recognition algorithm.

12. The vehicle-mounted device according to claim 11, wherein the at least one processor is further caused to:

wherein the determining the category of the parking position of the vehicle based on the image features of the traffic line further comprises:

determining that the parking position of the vehicle is a no-parking position when the color feature of the traffic line is red; and determining that the parking position of the vehicle is the legal parking position when the color feature of the traffic line is white.

13. The vehicle-mounted device according to claim 8, wherein the at least one processor is further caused to:

store related information of the vehicle when the vehicle parks illegally;

wherein the related information of the vehicle comprises driver information of the vehicle, a license plate number of the vehicle, the parking position of the vehicle, and the time when the vehicle parks illegally.

14. The vehicle-mounted device according to claim 13, wherein the at least one processor is further caused to:

analyze parking violations of all vehicles based on the related information of all vehicles, comprising:

determining the parking positions which are illegally parked for a greatest number of times; and determining the drivers who parked illegally for a greatest/least number of times.

15. A non-transitory storage medium having instructions stored thereon, when the instructions are executed by a processor of a vehicle-mounted device, the processor is configured to perform a parking assistance method, wherein the method comprises:

recognizing image features of a traffic line corresponding to a parking position of a vehicle;

determining a category of the parking position of the vehicle based on the image features of the traffic line; the image features comprise color features;

determining whether the vehicle parks illegally based on the category of the parking position of the vehicle;

issuing a warning when the vehicle parks illegally;

determining that the parking position of the vehicle is a legal parking position when the traffic line corresponding to the parking position of the vehicle is not recognized;

the determining the category of the parking position of the vehicle based on the image features of the traffic line comprises:

determining that the parking position of the vehicle is a temporary parking position when the color feature of the traffic line is yellow;

detecting parking parameters of the vehicle when the parking position of the vehicle is the temporary parking position, and determining whether the vehicle parks illegally based on the parking parameters of the vehicle and a parking rule corresponding to the temporary parking position;

wherein the parking parameters of the vehicle comprise a parking time period, a parking time length, and whether an engine of the vehicle is turned off when the vehicle parks at the parking position.

16. The non-transitory storage medium according to claim 15, wherein the recognizing the image features of the traffic line corresponding to the parking position of the vehicle comprises:
   locating the parking position of the vehicle on a high-precision map using a positioning device; and
   obtaining the image features of the traffic line corresponding to the parking position of the vehicle from the high-precision map.

17. The non-transitory storage medium according to claim 16, wherein the positioning device is a combination of a GPS device and a gyroscope.

18. The non-transitory storage medium according to claim 15, wherein the recognizing the image features of the traffic line corresponding to the parking position of the vehicle comprises:
   capturing an image of the traffic line corresponding to the parking position of the vehicle using a camera; and
   recognizing the image features of the traffic line from the image using an image recognition algorithm.

* * * * *